United States Patent
Iizuka

[19]

[11] Patent Number: 5,957,808
[45] Date of Patent: Sep. 28, 1999

[54] NEUTRAL CONTROL DEVICE OF AUTOMATIC TRANSMISSION

[75] Inventor: Naonori Iizuka, Fuji, Japan

[73] Assignee: Jatco Corporation, Japan

[21] Appl. No.: 09/121,994

[22] Filed: Jul. 24, 1998

[30] Foreign Application Priority Data

Aug. 8, 1997 [JP] Japan ................................ 9-214333

[51] Int. Cl.[6] .................................................. F16H 61/20
[52] U.S. Cl. ........................... 477/116; 477/117; 477/158
[58] Field of Search .................................. 477/116, 117, 477/156, 158

[56] References Cited

U.S. PATENT DOCUMENTS

| | | | |
|---|---|---|---|
| 4,800,497 | 1/1989 | Koori et al. | 477/117 X |
| 4,930,080 | 5/1990 | Suzuki | 477/117 X |
| 5,107,723 | 4/1992 | Yamashita et al. | 477/117 |
| 5,329,830 | 7/1994 | Kitagawa et al. | 477/117 |
| 5,385,511 | 1/1995 | Iizuka | 477/117 X |
| 5,690,581 | 11/1997 | Nadayoshi et al. | 477/155 X |
| 5,707,316 | 1/1998 | Tanahashi et al. | 477/116 |
| 5,749,802 | 5/1998 | Tanahashi et al. | 477/117 X |
| 5,842,950 | 12/1998 | Tsutsui et al. | 477/116 X |

*Primary Examiner*—Khoi Q. Ta
*Attorney, Agent, or Firm*—Rossi & Associates

[57] ABSTRACT

A neutral control device of an automatic transmission of a motor vehicle is provided in which a neutral control condition is satisfied when an accelerator pedal is released while a forward drive range is being selected, and a hydraulic oil pressure applied to a forward drive engaging element that is to be engaged in the forward drive range is controlled using a line pressure as an original pressure, so that the forward drive engaging element has no engaging capacity when the neutral control condition is satisfied. In this neutral control device, the neutral control condition is determined to be failed when the accelerator pedal is depressed during neutral control so as to start the vehicle, and vehicle control means is provided for controlling the line pressure in a control mode different from a normal line pressure control mode, during a period that extends from a point of time when it is judged that the neutral control condition fails to be satisfied, to a point of time when the forward drive engaging element has a sufficient engaging capacity. This results in reduction of shocks when the vehicle is started immediately after cancellation of neutral control for preventing creeping of the vehicle.

6 Claims, 8 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◍ |
| 2nd |  |  | ○ | ○ |  |  |
| 3rd |  | ○ |  | ○ |  |  |
| 4th |  | ○ | ○ |  |  |  |
| Rev | ○ |  |  |  | ○ |  |

| SOLENOID<br>GEAR POSITION | SHIFT SOLENOID (A) | SHIFT SOLENOID (B) |
|---|---|---|
| 1st-Speed | ○ | ○ |
| 2nd-Speed | × | ○ |
| 3rd-Speed | × | × |
| 4th-Speed | ○ | × |

○ ··· ON (Drain Circuit Closed)
× ··· OFF (Drain Circuit Open)

NEUTRAL CONTROL DEVICE OF AUTOMATIC TRANSMISSION

BACKGROUND OF THE INVENTION

1. Field of the Invention

The present invention relates to a neutral control device of an automatic transmission of a motor vehicle, which controls a hydraulic pressure so that a forward drive engaging element has no engaging capacity, i.e., the forward drive engaging element is placed in a neutral state, when neutral control conditions that the vehicle is stopped and an accelerator pedal is released are satisfied while a forward drive range is being selected.

2. Description of the Prior Art

A known example of the neutral control device of the automatic transmission is disclosed in Japanese Patent Application laid-open Publication No. 4-290671.

This known neutral control device was developed in an attempt to improve the response to cancellation of control for preventing creeping of the vehicle, and the durability of a frictional engaging device, while at the same time reducing shift shocks. To this end, in a system adapted to prevent creeping of the vehicle when certain conditions indicating a neutral state of the vehicle are satisfied with a forward drive range being selected, and smoothing control of an engaging pressure is performed upon cancellation of the creeping preventive control, a forward clutch is engaged in an early time when cancellation of the creeping preventive control is to be followed by quick start of the vehicle, and the smoothing control is performed as intended when cancellation of the creeping preventive control is to be followed by slow start of the vehicle.

In the known neutral control device of the transmission, smoothing control is performed when the vehicle is to be slowly started after the creeping preventive control is canceled. Under this smoothing control, however, the forward clutch pressure cannot be controlled as desired if only a solenoid Sd for supplying a hydraulic pressure to the forward clutch is actuated or operated for executing this control while the line pressure is varied in a normal manner in accordance with changes in the position of the accelerator pedal.

Figure 11:
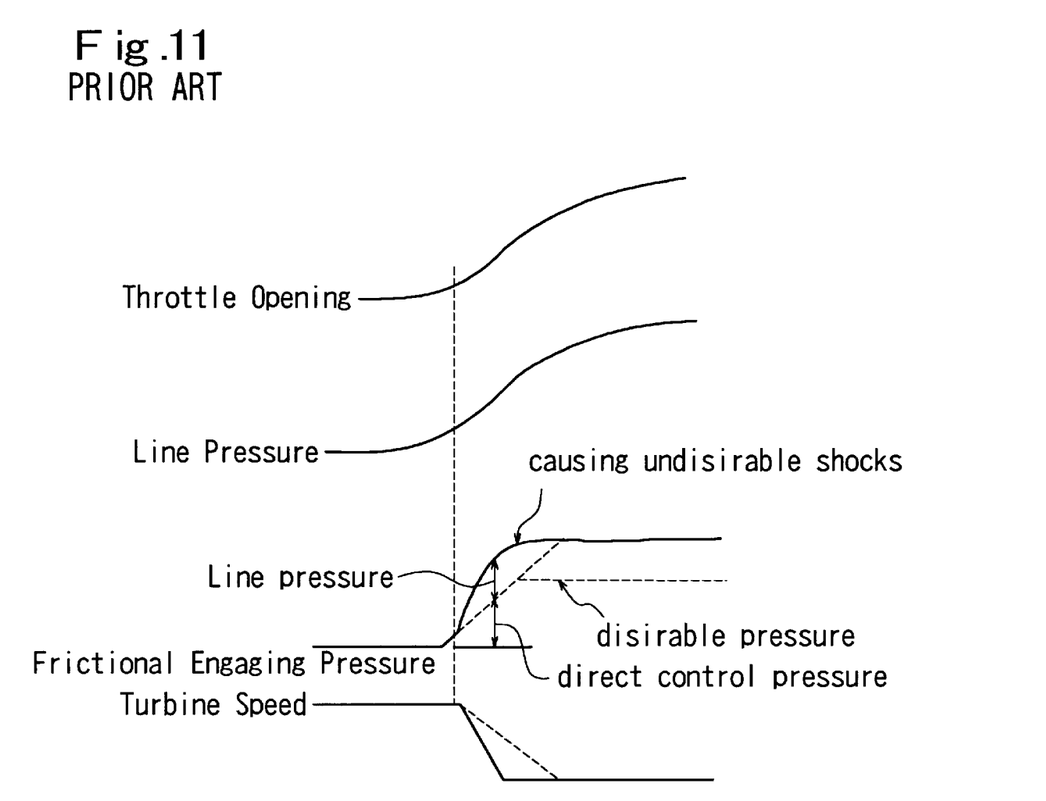
FIG. 11 is a time chart showing control characteristics of neutral control and vehicle start control of a known example.

Namely, the line pressure serves as an original pressure of the frictional engaging device, and therefore the frictional engaging pressure to be applied to the forward clutch, or the like, is increased with an increase in the line pressure. If the forward clutch pressure is subjected to smoothing control upon slow start of the vehicle, therefore, the obtained forward clutch pressure becomes equal to a hydraulic oil pressure as a sum of a direct control pressure and the line pressure, as shown in FIG. 11, resulting in increased shocks upon engagement of the forward clutch, thus causing undesirable shocks upon start of the vehicle.

SUMMARY OF THE INVENTION

It is therefore an object of the present invention to provide a neutral control device of an automatic transmission, which is sure to provide a desirable characteristic of a forward drive engaging element pressure that leads to reduction of shocks upon start of the vehicle, when the vehicle is started immediately after cancellation of neutral control for preventing creeping of the vehicle.

Figure 1:
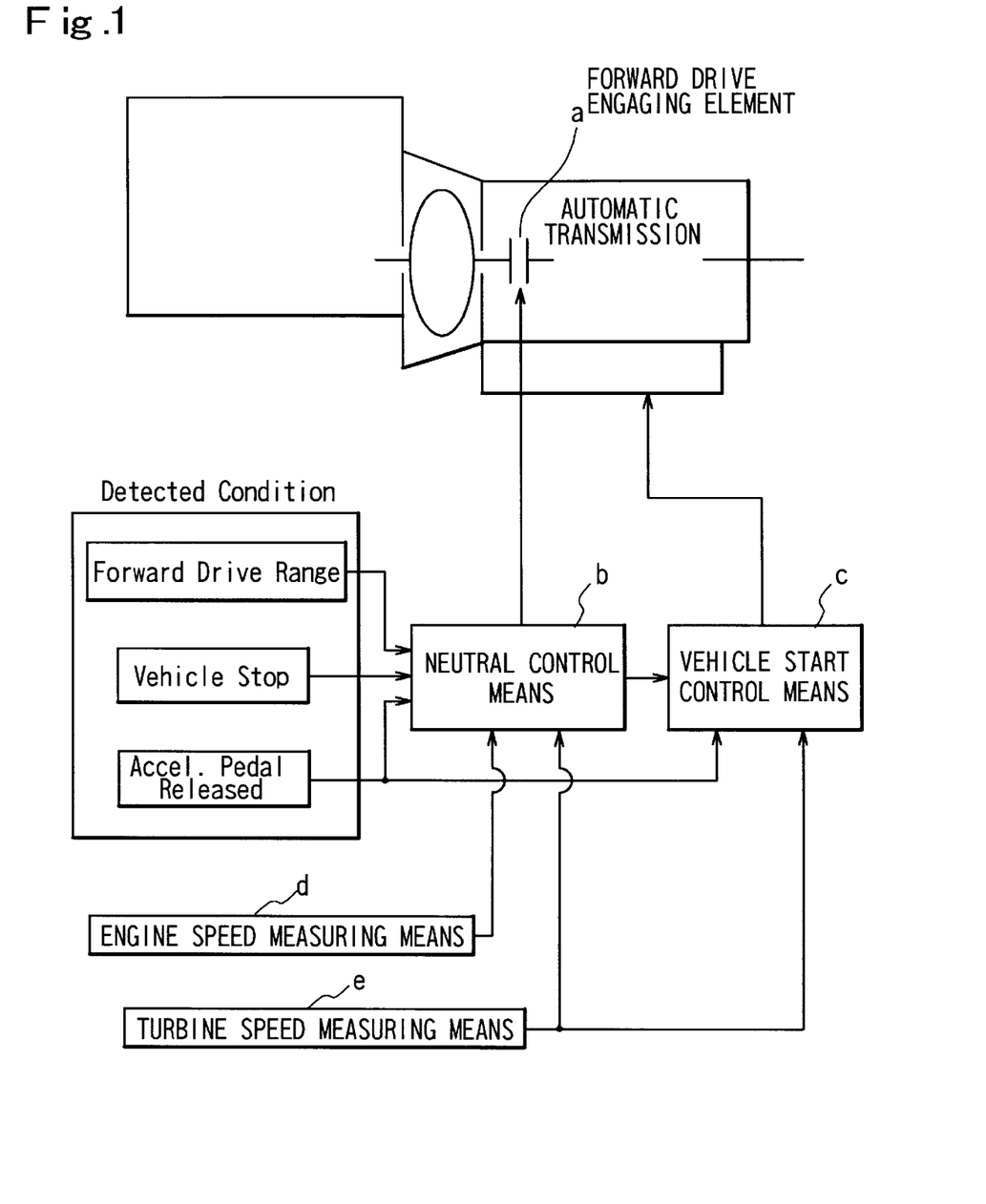
FIG. 1 is a view showing a neutral control device of an automatic transmission according to the present invention.

To accomplish the above object, there is provided a neutral control device of an automatic transmission of a motor vehicle as shown in FIG. 1, which device comprises neutral control means "b" for establishing a neutral control condition that is satisfied when an accelerator pedal is released and the vehicle is stopped while a forward drive range is being selected, and controlling a hydraulic oil pressure of a forward drive engaging element "a" to be engaged in the forward drive range, using a line pressure as an original pressure, so that the forward drive engaging element has no engaging capacity when the neutral control condition is satisfied. This neutral control device further includes vehicle start control means "c" for controlling the line pressure in a control mode different from a normal line pressure control mode, during a period that extends from a point of time when the accelerator pedal is depressed during neutral control and it is judged that the neutral control condition fails to be satisfied, to a point of time when the forward drive engaging element "a" is given a sufficient engaging capacity.

In one preferred form of the present invention, the neutral control device further includes engine speed measuring means "d" for detecting an engine speed of the vehicle, and turbine speed measuring means "e" for detecting a turbine speed of a torque converter, and the neutral control means "b" calculates a difference between the engine speed detected by the engine speed measuring means, and the turbine speed detected by the turbine speed measuring means, and controls the hydraulic oil pressure so that the difference becomes equal to or smaller than a predetermined value.

In the above arrangement, the slipping amount of the forward drive engaging element "a" is monitored by detecting the turbine speed, and the slipping engaging capacity of the forward drive engaging element is kept at an appropriate level that corresponds to the engine speed. Thus, the present neutral control device ensures a desirable characteristic of the forward drive engaging element pressure which leads to reduction of shocks when the vehicle is started immediately after the neutral control for preventing creeping of the vehicle is canceled.

In another preferred form of the invention, the vehicle start control means "c" controls the line pressure in a control mode different from the normal line pressure mode, during a period that extends from a point of time when it is judged that the neutral control condition fails to be satisfied, to a point of time when the detected value of the turbine speed received from turbine speed measuring means becomes equal to or lower than a predetermined value.

In the above form of the invention in which the line pressure is controlled in a control mode different from a normal line pressure control, until the detected value of the turbine speed becomes equal to or smaller than the predetermined value, the vehicle start control can be terminated in appropriate timing, without suffering from influences due to varying environmental factors, such as an oil temperature.

In a further preferred form of the present invention, the hydraulic oil pressure applied to the forward drive engaging element and the line pressure are controllable independently of each other, and the line pressure is controlled according to a selected one of a normal line pressure control characteristic having a high gain with respect to a throttle opening, and a special line pressure control characteristic having a low gain with respect to the throttle opening. In this case, the neutral control means performs neutral control under line pressure control based on the normal line pressure control characteristic, and the vehicle start control means uses the line pressure based on the special line pressure control characteristic, as the hydraulic oil pressure applied to the forward drive engaging element. In this arrangement, the special line pressure control performed during vehicle start control can be smoothly shifted to the normal line pressure control upon termination of the vehicle start control, without causing a rapid increase in the line pressure.

In another preferred form of the present invention, the hydraulic oil pressure applied to the forward drive engaging element and the line pressure are controllable independently of each other, and the neutral control means performs neutral control under normal line pressure control in which the line pressure is controlled in accordance with the position of the accelerator pedal, while the vehicle start control means inhibits the normal line pressure control, and uses a constant line pressure which is fixed irrespective of the position of the accelerator pedal, as the hydraulic oil pressure applied to the forward drive engaging element. In this case, the control mode can be smoothly or readily shifted from the neutral control mode to the vehicle start control mode, due to the forward drive engaging element pressure control which is not influenced by the line pressure control.

According to another aspect of the present invention, there is provided a neutral control device of an automatic transmission of a motor vehicle, wherein a neutral control condition is satisfied when an accelerator pedal is released and the vehicle is stopped while a forward drive range is being selected, and a hydraulic oil pressure applied to a forward drive engaging element to be engaged in the forward drive range is controlled using a line pressure as an original pressure, so that the forward drive engaging element has no engaging capacity when the neutral control condition is satisfied. In this neutral control device, the hydraulic oil pressure applied to the forward drive engaging element is controlled only by controlling the line pressure, and the line pressure is controlled in a control mode different from a normal line pressure control mode, during a period that extends from a point of time when the accelerator pedal is depressed during neutral control and it is judged that the neutral control condition fails to be satisfied, to a point of time when the forward drive engaging element is given a sufficient engaging capacity. This neutral control device may be employed in an automatic transmission provided only with line pressure control means, assuring a desirable characteristic of a forward drive engaging element pressure which is able to reduce shocks when the vehicle is started immediately after cancellation of the neutral control for preventing creeping of the vehicle.

BRIEF DESCRIPTION OF THE DRAWINGS

The invention will be described in greater detail with reference to preferred embodiments thereof and the accompanying drawings, wherein.

DETAILED DESCRIPTION OF THE PREFERRED EMBODIMENTS

The first embodiment of the present invention will be described in detail.

Figure 2:
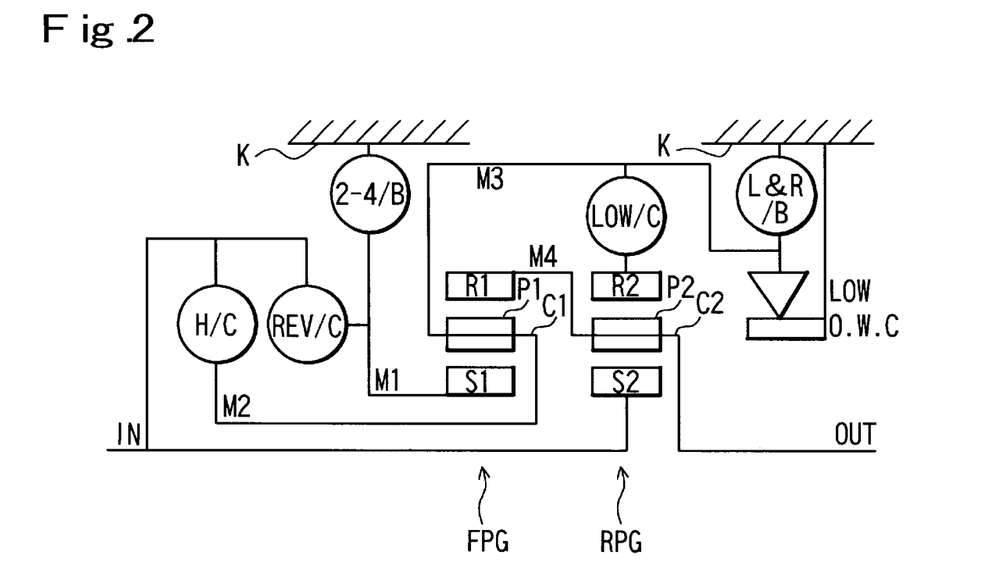
FIG. 2 is a view schematically showing a power transmitting system of the automatic transmission using the neutral control device of the first embodiment of the invention.

FIG. 2 is a view schematically showing a power transmitting system of an automatic transmission in which a neutral control device of the present embodiment is employed. In FIG. 2, IN is an input shaft, and OUT is an output shaft, while FPG is a front planetary gear system, and RPG is a rear planetary gear system. The front planetary gear system FPG includes a first sun gear S1, first ring gear R1, first pinion P1, and a first pinion carrier C1. The rear planetary gear system RPG includes a second sun gear S2, second ring gear R2, second pinion P2, and a second pinion carrier C2.

Engaging elements for establishing forward 4-speed, reverse 1-speed gear positions by using the above-described gear train arrangement are provided which include a reverse brake REV/C (hereinafter referred to as R/C), high clutch HIGH/C (hereinafter referred to as H/C), 2-4 brake 2-4/B, low clutch LOW/C (hereinafter referred to as L/C), low & reverse brake L&R/B, and a low one-way clutch LOW O.W.C.

The first sun gear S1 is connected to the input shaft IN through a first rotary member M1 and the reverse clutch R/C, and also connected to a case K through the first rotary member M1 and the 2-4 brake 2-4/B.

The first carrier C1 is connected to the input shaft IN through a second rotary member M2 and the high clutch H/C, and also connected to the case K through a third rotary member M3 and the low & reverse brake L&R/B. Further, the first carrier C1 is connected to the second ring gear R2 through the third rotary member M3 and the low clutch L/C. The low one-way clutch LOW O.W.C. is disposed in parallel with the low & reverse brake L&R/B.

The first ring gear R1 is directly connected to the second carrier C2 through a fourth rotary member M4, and the output shaft OUT is directly connected to the second carrier C2. The second sun gear S2 is directly connected to the input shaft IN.

This power transmitting system is characterized in that it does not include a one-way clutch for controlling the shift timing so as to eliminate shift shocks upon shifting-down from the 4th-speed to 3rd-speed gear position, and a hydraulically operated clutch that is needed for ensuring the effect of engine brakes when this one-way clutch is employed. Due to elimination of these clutches, the number of engaging elements is reduced, leading to reduced size and weight of the power transmitting system.

Figure 3:
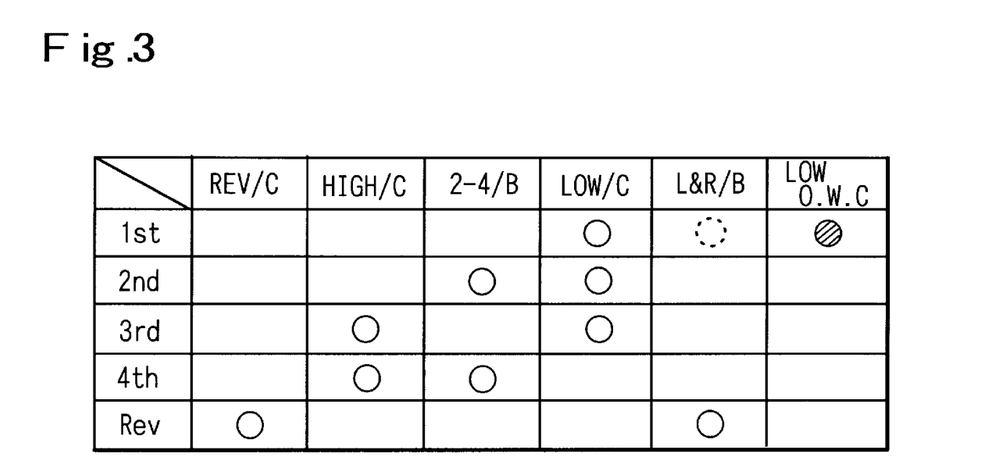
FIG. 3 is a table showing engaging states of frictional engaging elements of the power transmitting system of FIG. 2.

FIG. 3 is a view showing engaged and unengaged states of the engaging elements of the above-described power transmitting system for establishing the forward 4-speed, reverse 1-speed gear positions.

The 1st-speed gear position is established by hydraulically engaging the low clutch L/C, and hydraulically engaging the low & reverse brake L&R/B (when an engine brake range is selected) or mechanically engaging the low one-way clutch LOW O.W.C. (when the vehicle is accelerated). In this case, the second sun gear S2 receives the input rotation of the input shaft IN, and the second ring gear R2 is fixed, while the rotation of the second carrier C2 is output to the output shaft OUT.

The 2nd-speed gear position is established by hydraulically engaging the low clutch L/C and the 2-4 brake 2-4/B. In this case, the second sun gear S2 receives the input rotation of the input shaft IN, and the first sun gear S1 is fixed, while the rotation of the second carrier C2 is output to the output shaft OUT.

The 3rd-speed gear position is established by hydraulically engaging the high clutch H/C and the low clutch L/C. In this case, the second ring gear R2 and second sun gear S2 are concurrently connected to the input shaft IN, and the rotation of the second carrier C2 is output to the output shaft OUT, so that the transmission gear ratio becomes equal to 1.

The 4th-speed gear position is established by hydraulically engaging the high clutch H/C and the 2-4 brake 2-4/B. In this case, the first carrier C1 and second sun gear S2 are connected to the input shaft IN, and the first sun gear S1 is fixed, while the rotation of the second carrier C2 is output to the output shaft OUT, so as to establish the overdrive gear position.

The reverse gear position is established by hydraulically engaging the reverse clutch REV/C and the low & reverse brake L&R/B. In this case, the first and second sun gears S1, S2 are connected to the input shaft IN, and the first carrier C1 is fixed, while the rotation of the second carrier C2 is output to the output shaft OUT.

The 2-4 brake 2-4/B is a multiple-disc brake that is constructed similarly to a multiple-disc clutch.

Figure 4:
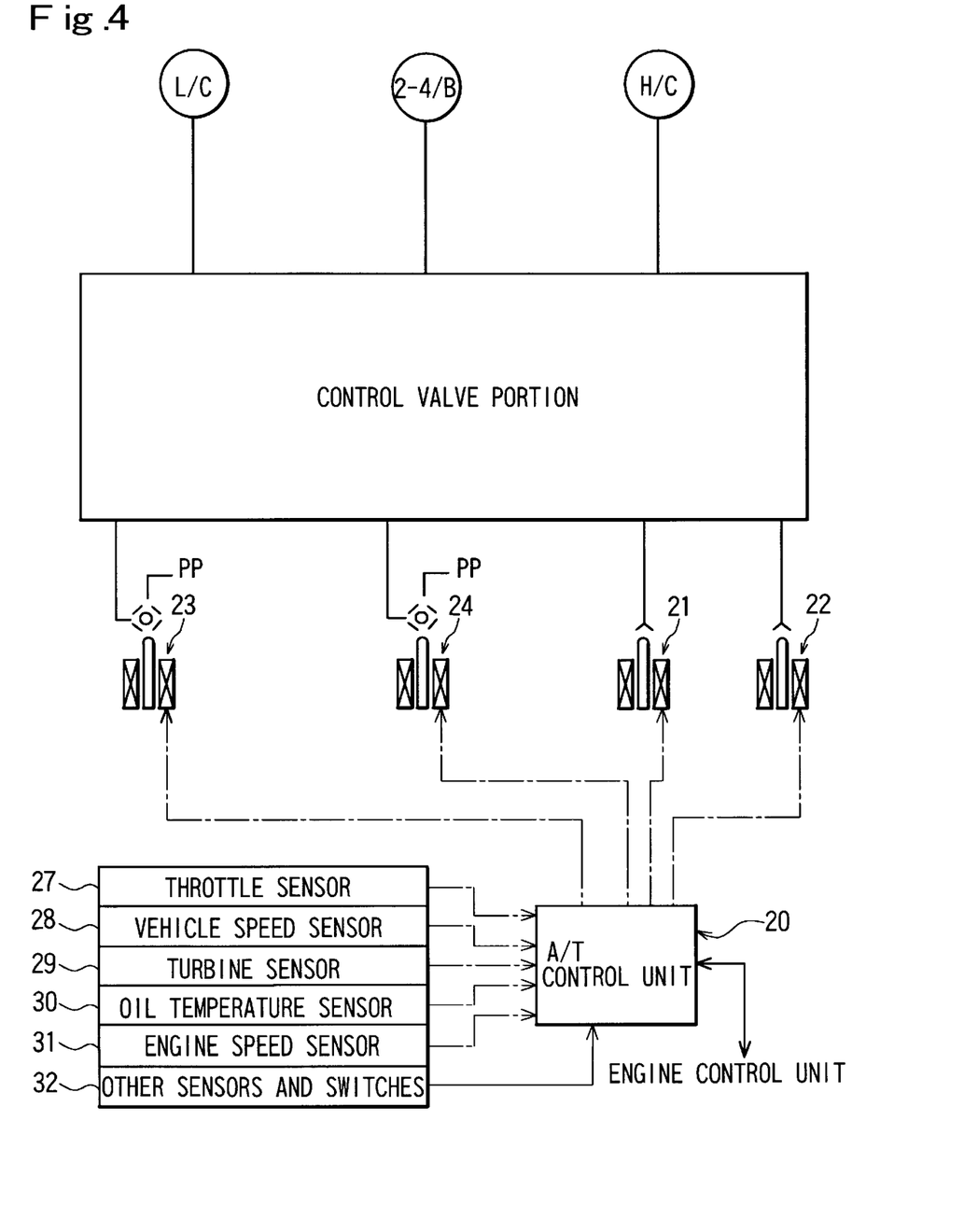
FIG. 4 is a diagram showing the whole control system including frictional engaging elements, a hydraulic control portion and an electronic control portion, which are associated with neutral control of the automatic transmission.

FIG. 4 is a control system diagram showing a control valve portion, an electronic control portion, and engaging elements for automatically shifting the transmission to establish one of the above-indicated 1st-speed to 4th-speed gear positions in the D (drive) range.

The engaging elements include the low clutch L/C, 2-4 brake 2-4/B, and the high clutch H/C. The low clutch L/C corresponds to the above-indicated forward drive engaging element "a".

In the control valve portion of FIG. 4, valves, such as a shift valve (A) and a shift valve (B) that are not illustrated, are provided for switching oil paths to establish each of the 1st-speed to 4th-speed (overdrive) gear positions according to the operations of a shift solenoid (A) 21 and a shift solenoid (B) 22, respectively.

The electronic control portion of FIG. 4 includes the shift solenoid (A) 21, shift solenoid (B) 22, a line pressure duty solenoid 23, and a low clutch pressure duty solenoid 24, as actuators for controlling oil pressures according to drive commands generated by an A/T control unit 20.

The A/T control unit 20 receives various signals as input information from various sensors, such as a throttle sensor 27 for detecting the throttle opening of a throttle valve, a vehicle speed sensor 28 for detecting the vehicle speed, a turbine sensor 29 (corresponding to turbine speed measuring means "e") for detecting the rotating speed of a turbine runner, an oil temperature sensor 30 for detecting the oil temperature, an engine speed sensor 31 (corresponding to engine speed measuring means "d") for detecting the engine speed, and other sensors and switches 32.

Figure 5:
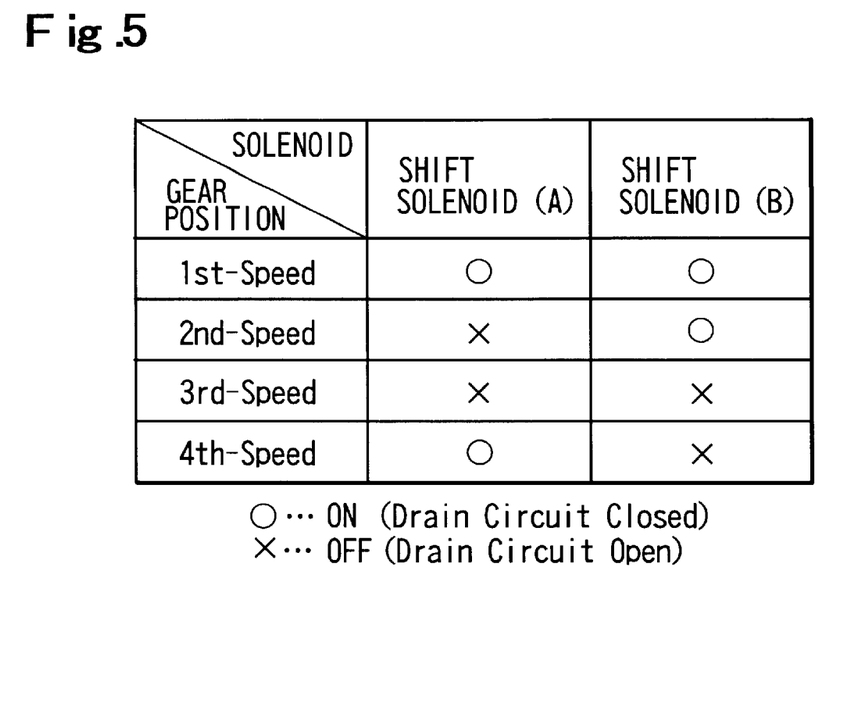
FIG. 5 is a table showing operated states of shift solenoids of the automatic transmission.
Figure 6:
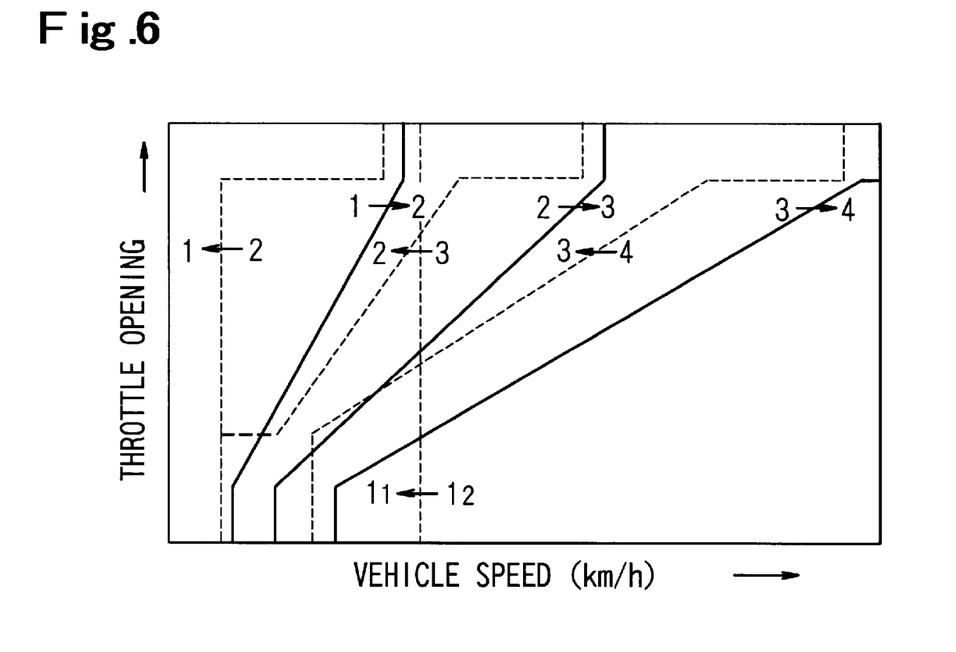
FIG. 6 is a graph showing gear change point characteristics employed by the automatic transmission.

To perform shift control for automatically shifting the transmission from one of the 1st-speed to 4th-speed gear positions to another in the D (drive) range, a gear change command is first generated based on the diagram of FIG. 6 indicating gear change points in relation to the detected throttle opening and vehicle speed, when the current point (relationship between the throttle opening and the vehicle speed) on the diagram passes one of upshifting and downshifting lines, and the gear position to which the transmission should be shifted is determined by this gear change command. To establish the thus determined gear position, the A/T control unit 20 generates an ON- or OFF-command to each of the shift solenoid (A) 21 and shift solenoid (B) 22 according to the table of FIG. 5 indicating operated states of the shift solenoids.

There will be next explained the operation of the present embodiment.

Neutral Control and Control operation upon Start of Vehicle

Figure 7:
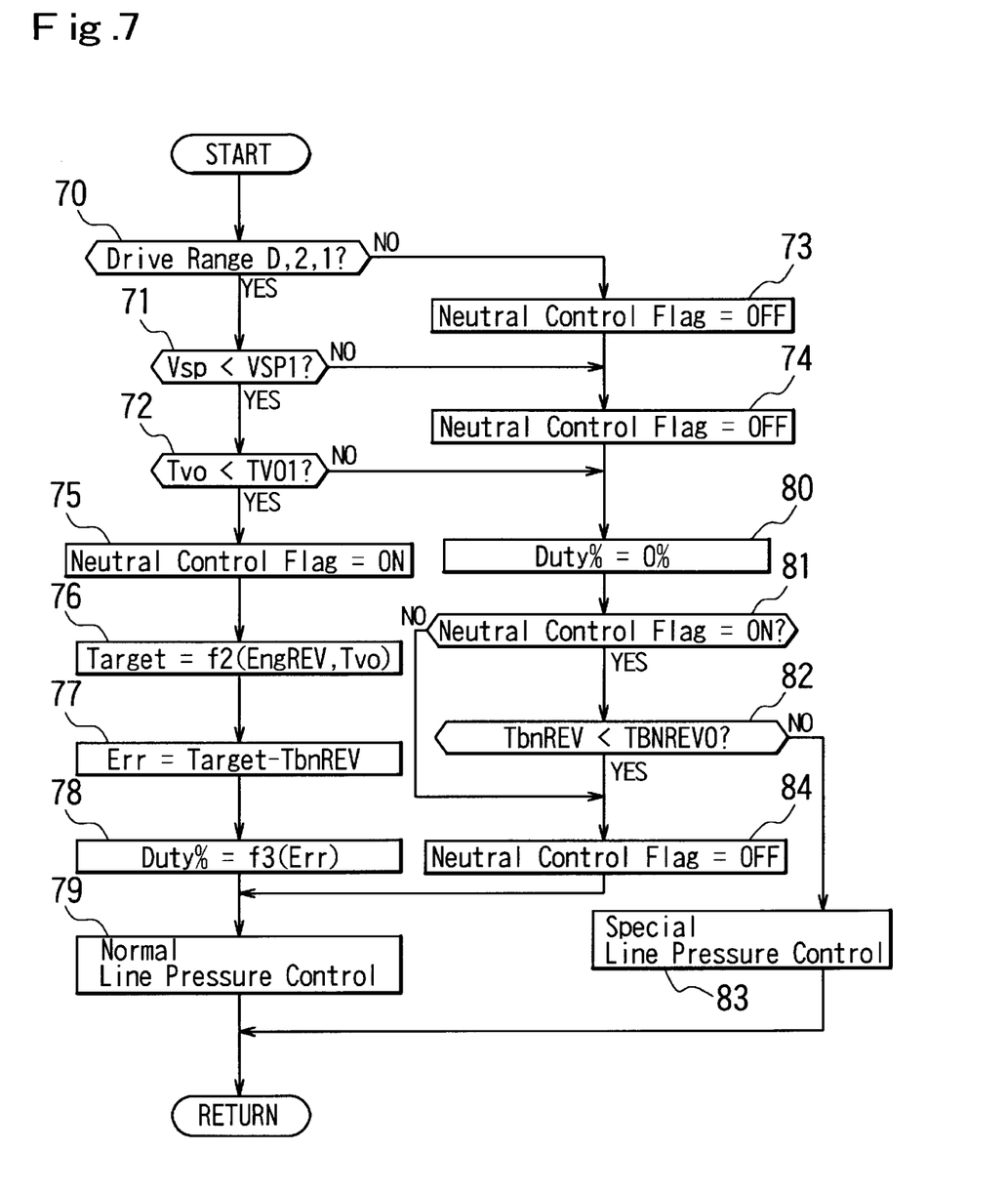
FIG. 7 is a flowchart showing the control flow of neutral control and control operation upon start of the vehicle, which are performed by an A/T control unit.

FIG. 7 is a flowchart showing the flow of neutral control and vehicle start control which are performed by the A/T control unit 20.

Initially, in step 70 of FIG. 7, it is determined whether any of forward drive ranges (D range, 2nd-speed fixed range, and 1st-speed fixed range) is currently selected or not. In step 71, it is determined whether the current vehicle speed Vsp detected by the vehicle speed sensor 28 is lower than a neutral control vehicle speed VSP1. In step 72, it is determined whether the current throttle opening Tvo detected by the throttle sensor 27 is smaller than a neutral control opening TVO1.

If a negative decision (NO) is obtained in step 70, namely, if it is determined that a shift range other than the above-indicated forward drive ranges is currently selected, step 73 is executed to set a neutral control flag to OFF. If a negative decision (NO) is obtained in step 71, namely, if it is determined that the detected vehicle speed Vsp is equal to or greater than the neutral control vehicle speed VSP1, step 74 is executed to set the neutral control flag to OFF. If affirmative decisions (YES) are obtained in all of the above steps 70, 71, 72, namely, all of the neutral control conditions as set forth in steps 70, 71, 72 are satisfied, step 75 is executed to set the neutral control flag to ON. In step 76, a target engine speed Target used for neutral control is calculated as a function of the current engine speed EngREV and the detected throttle opening Tvo.

In step 77, an error Err which is a difference between the target engine speed Target and the current turbine speed TbnREV detected by the turbine sensor 29 is calculated. In step 78, a duty ratio (Duty %) is calculated so that the error Err becomes equal to or smaller than a predetermined value, and a low clutch pressure control command is generated to the low clutch pressure duty solenoid 24 so that the solenoid 24 is operated at the duty ratio thus calculated. Instep 79, normal line pressure control is performed on the basis of line pressure control data indicated by a solid line in FIG. 8. Step 70 through step 79 correspond to neutral control means "b".

When a negative decision (NO) is obtained in step 72, namely, when it is determined that the detected throttle opening Tvo is equal to or greater than the neutral control opening TVO1, step 80 is executed to set the duty ratio Duty % to 0%, and output this duty ratio to the low clutch pressure duty solenoid 24. As a result, the line pressure is supplied as it is to the low clutch L/C. In step 81, it is determined whether the neutral control flag is currently set to ON. If step 81 determines that the neutral control flag is set in the ON state, step 82 is executed to determine whether the current turbine speed TbnREV is lower than a predetermined turbine speed TBNREVO. While a negative decision (NO) is obtained in step 82, namely, while step 82 determines that the current turbine speed TbnREV is equal to or greater than the predetermined turbine speed TBNREVO, step 83 is executed to perform special line pressure control according to line pressure control data indicated by a dotted line in FIG. 8.

If step 82 determines that the current turbine speed TbnREV is lower than the predetermined turbine speed TBNREVO, step 84 is executed to rewrite the neutral control flag from ON into OFF.

The above-described step 80 through step 84 correspond to vehicle start control means "c".

Neutral Control Operation

When one of the forward drive ranges is selected, and the vehicle is stopped with the accelerator pedal being released (not depressed), the neutral control is performed by successively executing step 70, step 71, step 72, step 75, step 76, step 77, step 78 and step 79 in this order in the flowchart of FIG. 7.

Figure 9:
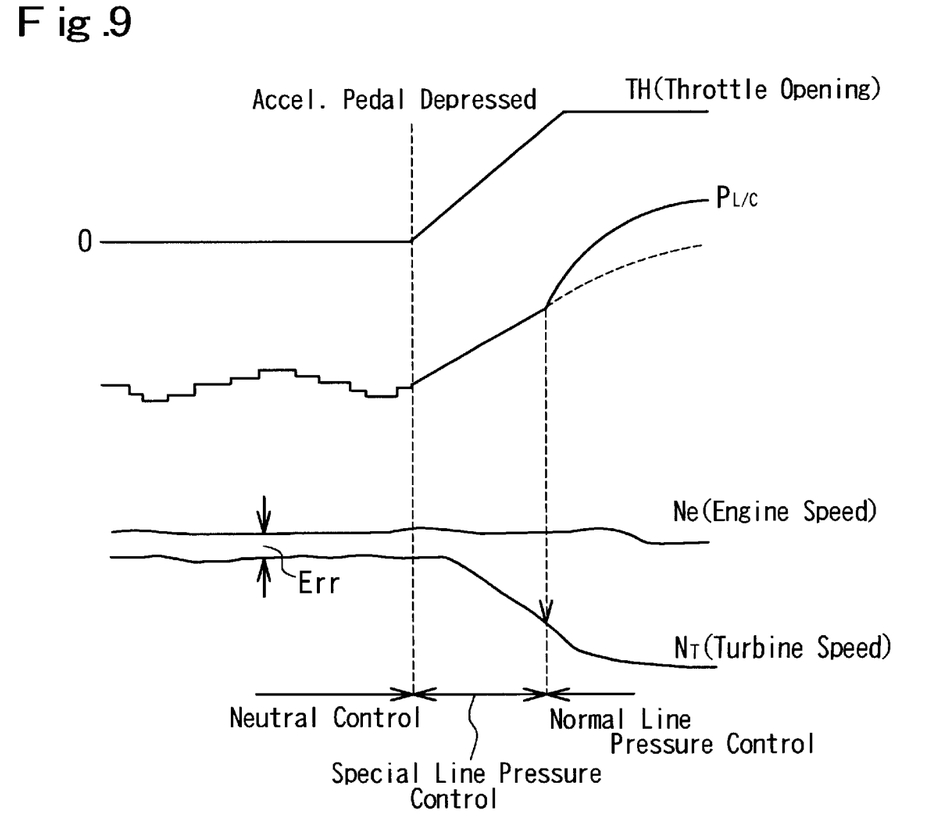
FIG. 9 is a time chart showing control characteristics of the neutral control and vehicle start control of the first embodiment of the present invention.

Namely, steps 70, 71, 72 serve to determine whether the neutral control conditions are satisfied, and, if all of the neutral control conditions are satisfied, the low clutch pressure PL/C is controlled so that the error Err as a difference between the target engine speed Target and the currently detected turbine speed TbnREV becomes equal to or smaller than the predetermined value (FIG. 9).

As a result of this neutral control, the low clutch L/C has no engaging capacity, and is placed in an engaged state which permits slipping, thus avoiding a so-called creep phenomenon in which the vehicle moves forward by a small distance at a time due to slight torque transmission through a torque converter while the vehicle is stopped with the drive range being selected.

Figure 8:
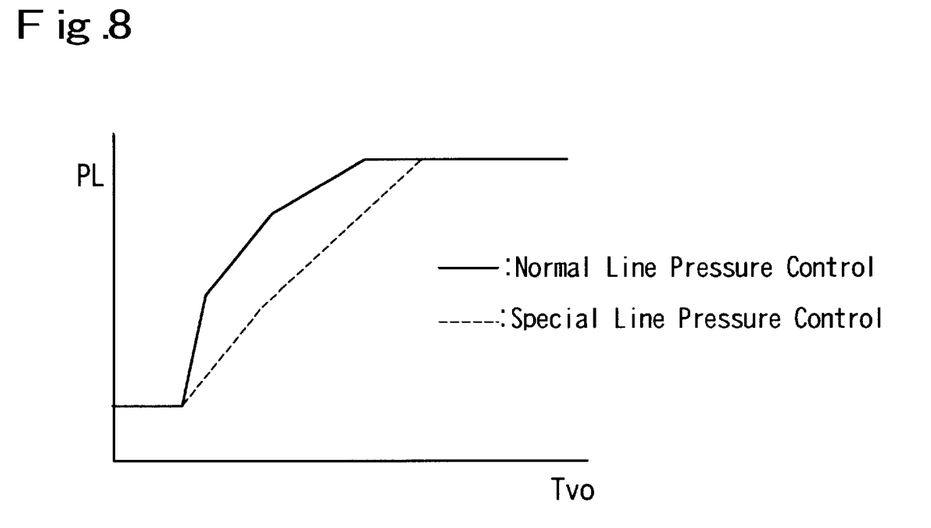
FIG. 8 is a graph showing line pressure control data.

Although the normal line pressure control is performed in step 79 during the neutral control, the throttle opening condition for executing the neutral control, i.e., Tvo<TVO1 (for example, TVO1=$\frac{1}{16}$), is satisfied, and therefore the line pressure PL is kept at the lowest pressure level during this neutral control, as is apparent from the line pressure control data shown in FIG. 8. Thus, the line pressure control does not interfere with the low clutch pressure control.

Control Operation upon Start of Vehicle

If the driver depresses the accelerator pedal during neutral control in an attempt to start the vehicle, the throttle opening condition set forth in step 72 is no longer satisfied, and the control flow goes from step 70, step 71 and step 72 to step 80, step 81, step 82 and step 83, in the flowchart of FIG. 7.

Namely, if the vehicle starting operation is performed, the low clutch pressure control is interrupted (step 80), and slipping engagement of the low clutch ceases to be maintained, so that the line pressure is supplied as it is to the low clutch. Then, special line pressure control is executed instead of the normal line pressure control, until the turbine speed TbnREV becomes lower than the predetermined turbine speed TBNREVO, and the vehicle start control is performed so as to provide a low clutch pressure characteristic (FIG. 9) by controlling the line pressure, thereby to reduce shocks upon start of the vehicle.

The vehicle start control operation as described above is terminated when the turbine speed condition set forth in step 82 is satisfied. This is because shocks upon start of the vehicle can be avoided by performing smoothing control to supply a hydraulic pressure to the low clutch L/C during an engagement transition period until the low clutch L/C has a sufficient engaging capacity, and whether the low clutch L/C has a sufficient engagement capacity can be determined based on the turbine speed that is reduced with the progress of engagement of the clutch. In this manner, the vehicle start control is terminated at a point of time when the engaging capacity of the low clutch L/C reaches a predetermined level which does not vary depending upon the oil temperature and other conditions.

If the vehicle start control is performed during a period of time that starts when it is judged that the throttle opening condition fails to be satisfied, and ends upon a lapse of a predetermined time measured by a timer, the vehicle start control may be terminated before the low clutch L/C has a sufficient engaging capacity, and shocks may be induced upon start of the vehicle. To the contrary, if the vehicle start control using the smoothing control is not finished even after the low clutch L/C has a sufficient engaging capacity, the durability of the clutch is deteriorated.

Upon termination of the vehicle start control as described above, the control flow proceeds from step 81 to step 84 and step 79, and the normal line pressure control is performed.

In the neutral control device of the automatic transmission as described above, the following effects can be obtained.

(1) If the accelerator pedal is depressed during neutral control, and it is judged that the neutral control condition (throttle opening condition) fails to be satisfied, the vehicle start control is performed so as to provide a low clutch pressure characteristic for reducing shocks upon start of the vehicle, by executing the special line pressure control different from the normal control, during a period from the time when it is judged that the neutral control condition fails to be satisfied, to the time when the low clutch L/C is given a sufficient engaging capacity. With this arrangement, the neutral control device is sure to achieve a desired low clutch pressure characteristic that enables reduction of shocks upon start of the vehicle, when the vehicle is started immediately after the neutral control for avoiding creeping of the vehicle is canceled.

(2) Since the neutral control is performed by controlling the low clutch pressure PL/C so that the error Err as a difference between the target engine speed Target and the currently detected turbine speed TbnREV becomes equal to or smaller than the predetermined value, the slipping amount (=turbine speed) of the low clutch L/C can be kept at an appropriate value that corresponds to the engine speed, whereby the vehicle can be surely prevented from creeping during the neutral control.

(3) In the vehicle start control, the present device performs the special line pressure control different from the normal control, during a period from the time when it is judged that the neutral control condition fails to be satisfied, to the time when the turbine speed TbnREV becomes less than the predetermined turbine speed TBNREVO. Thus, the vehicle start control can be terminated in appropriate timing, without suffering from influences due to varying environmental factors, such as an oil temperature.

(4) In the present embodiment, the low clutch pressure PL/C and the line pressure PL are independently controlled by the low clutch pressure duty solenoid 24 and the line pressure duty solenoid 23, respectively. To control the line pressure, normal line pressure control data which provides a high gain with respect to the throttle opening Tvo, and special line pressure control data which provides a low gain with respect to the throttle opening are established. The neutral control is performed by controlling the low clutch pressure while maintaining the normal line pressure control, whereas the vehicle start control is performed by executing the line pressure control based on the special line pressure control data while interrupting the low clutch pressure control. This permits smooth transition from the special line pressure control during the vehicle start control, to the normal line pressure control after the vehicle start control is finished, without causing a rapid increase in the line pressure.

The second embodiment of the present invention will be next described.

Figure 10:
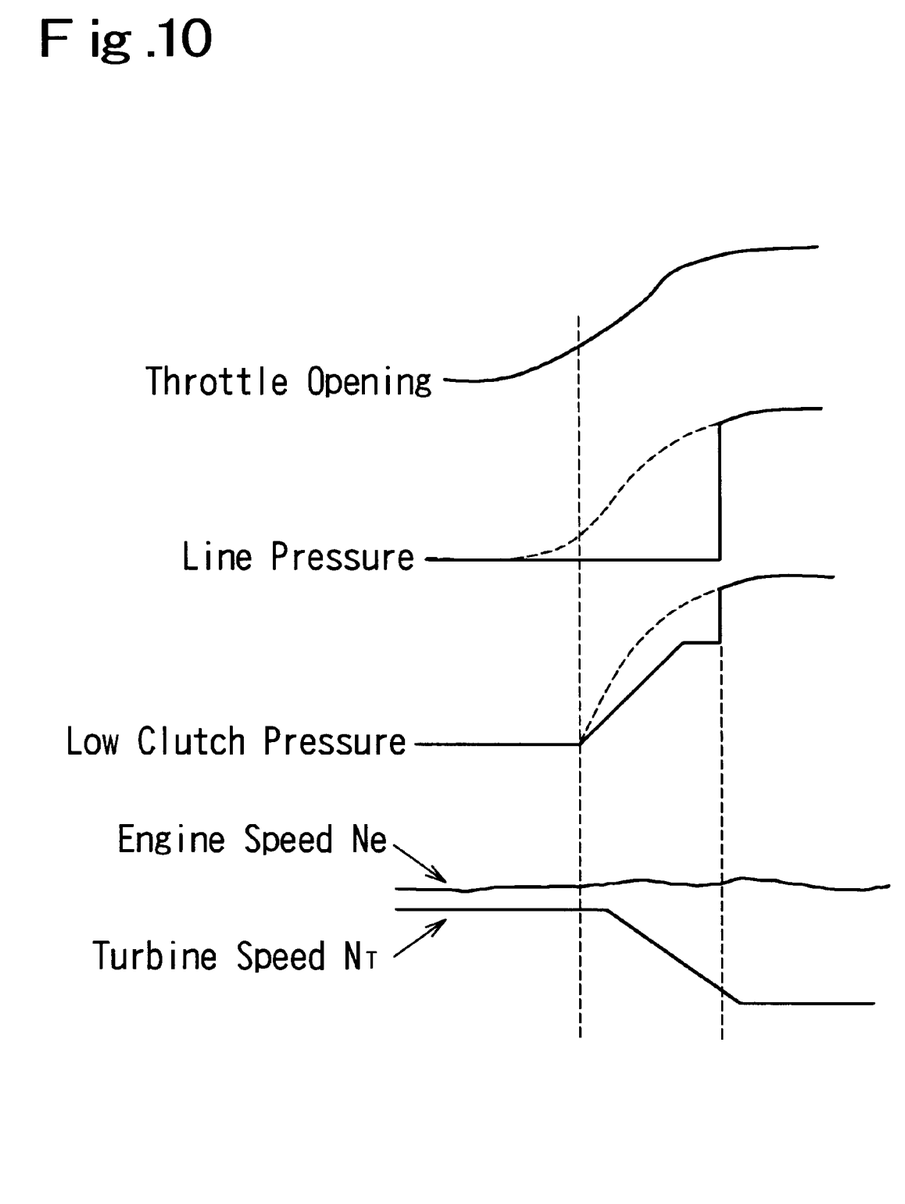
FIG. 10 is a time chart showing a modified example of control characteristics of the neutral control and the vehicle start control of the second embodiment of the invention.

In this embodiment, the control system of FIG. 4 is employed in which the low clutch pressure PL/C and the line pressure PL are independently controlled by the low clutch pressure duty solenoid 24 and the line pressure duty solenoid 23, respectively, as in the previous embodiment. However, the neutral control of this embodiment is performed by executing the low clutch L/C pressure control while maintaining the normal line pressure control that corresponds to the position of the accelerator pedal or the amount of depression of the accelerator pedal, and the vehicle start control is performed by executing the low clutch pressure control while inhibiting the normal line pressure control so that a constant line pressure is maintained irrespective of the position of the accelerator pedal as shown in FIG. 10. Consequently, the following effect can be obtained.

(5) The control mode can be smoothly shifted from the neutral control to the vehicle start control, due to the low clutch pressure control that is not influenced by the line pressure control.

In the illustrated embodiments, the low clutch pressure is directly controlled by the duty solenoid. It is, however, possible to control the pressure of the forward drive engaging element by controlling the back pressure of an accumulator provided in the middle of a working pressure circuit of the forward drive engaging element.

In the illustrated embodiments, the present invention is applied to the automatic transmission in which the low clutch pressure PL/C and the line pressure PL are controlled independently of each other. However, the present invention may be also applied to other type of automatic transmission in which only the line pressure PL can be controlled in response to commands received from the outside of the transmission, so that the neutral control is performed by executing line pressure control different from normal control, and the vehicle start control is performed by executing the special line pressure control similar to that of the first embodiment.

What is claimed is:

1. A neutral control device of an automatic transmission of a motor vehicle, comprising:

neutral control means for establishing a neutral control condition that is satisfied when an accelerator pedal is released and the vehicle is stopped while a forward drive range is being selected, and controlling a hydraulic oil pressure applied to a forward drive engaging element that is to be engaged in the forward drive range, using a line pressure as an original pressure, so that the forward drive engaging element has no engaging capacity when the neutral control condition is satisfied; and vehicle start control means for controlling the line pressure in a control mode different from a normal line pressure control mode, during a period that extends from a point of time when the accelerator pedal is depressed during neutral control and it is judged that the neutral control condition fails to be satisfied, to a point of time when the forward drive engaging element has a sufficient engaging capacity.

2. A neutral control device according to claim 1, further comprising:

engine speed measuring means for detecting an engine speed of the vehicle; and turbine speed measuring means for detecting a turbine speed of the vehicle;

wherein said neutral control means calculates a difference between the engine speed detected by said engine speed measuring means, and the turbine speed detected by said turbine speed measuring means, and controls the hydraulic oil pressure so that said difference becomes equal to or smaller than a predetermined value.

3. A neutral control device according to claim 1, further comprising a turbine speed measuring means for detecting a turbine speed of the vehicle, wherein said vehicle start control means controls the line pressure in the control mode different from the normal line pressure mode, during a period that extends from the point of time when it is judged that the neutral control condition fails to be satisfied, to a point of time when a detected value of the turbine speed received from said turbine speed measuring means becomes equal to or lower than a predetermined value.

4. A neutral control device according to claim 1, wherein the hydraulic oil pressure applied to the forward drive engaging element and the line pressure are controllable independently of each other, and the line pressure is controlled according to a selected one of a normal line pressure control characteristic having a high gain with respect to a throttle opening, and a special line pressure control characteristic having a low gain with respect to the throttle opening;

wherein said neutral control means performs neutral control under line pressure control based on the normal line pressure control characteristic; and wherein said vehicle start control means uses the line pressure based on the special line pressure control characteristic, as the hydraulic oil pressure applied to the forward drive engaging element.

5. A neutral control device according to claim 1, wherein the hydraulic oil pressure applied to the forward drive engaging element and the line pressure are controllable independently of each other;

wherein said neutral control means performs neutral control under normal line pressure control in which the line pressure is controlled in accordance with a position of the accelerator pedal;

wherein said vehicle start control means inhibits the normal line pressure control, and uses a constant line pressure which is fixed irrespective of the position of the accelerator pedal, as the hydraulic oil pressure applied to the forward drive engaging element.

6. A neutral control device of an automatic transmission of a motor vehicle, wherein a neutral control condition is satisfied when an accelerator pedal is released and the vehicle is stopped while a forward drive range is being selected, and a hydraulic oil pressure applied to a forward drive engaging element to be engaged in the forward drive range is controlled using a line pressure as an original pressure, so that the forward drive engaging element has no engaging capacity when the neutral control condition is satisfied,     wherein the hydraulic oil pressure applied to the forward drive engaging element is controlled only by controlling the line pressure, and     wherein the line pressure is controlled in a control mode different from a normal line pressure control mode, during a period that extends from a point of time when the accelerator pedal is depressed during neutral control and it is judged that the neutral control condition fails to be satisfied, to a point of time when the forward drive engaging element is given a sufficient engaging capacity.

\* \* \* \* \*